(12) United States Patent
Plummer et al.

(10) Patent No.: US 8,171,643 B1
(45) Date of Patent: *May 8, 2012

(54) METHOD FOR MAKING A DECORATIVE SECURITY PANEL FOR DOORS AND WINDOWS

(75) Inventors: John B. Plummer, Houston, TX (US); Marjorie Plummer, Spring, TX (US)

(73) Assignee: Glasscraft Door Company, Houston, TX (US)

(*) Notice: Subject to any disclaimer, the term of this patent is extended or adjusted under 35 U.S.C. 154(b) by 90 days.

This patent is subject to a terminal disclaimer.

(21) Appl. No.: 12/842,933

(22) Filed: Jul. 23, 2010

(51) Int. Cl.
*C08F 16/06* (2006.01)

(52) U.S. Cl. ............... 29/897.32; 29/897.312; 29/897.3

(58) Field of Classification Search .............. 29/897.32, 29/897.31, 897.312, 897.3, 897.15, 557, 29/558
See application file for complete search history.

(56) References Cited

U.S. PATENT DOCUMENTS

| | | |
|---|---|---|
| 3,308,593 A | 3/1967 | Smith |
| 3,791,095 A | 2/1974 | Martin |
| 3,946,531 A | 3/1976 | Armstrong |
| 4,204,015 A | 5/1980 | Wardlaw et al. |
| 4,567,710 A | 2/1986 | Reed |
| 4,652,472 A | 3/1987 | Davies |
| 4,783,938 A | 11/1988 | Palmer |
| 4,989,384 A | 2/1991 | Kinghorn et al. |
| 5,092,101 A | 3/1992 | Kunert |
| 5,267,421 A | 12/1993 | Salisbury |
| 5,345,743 A | 9/1994 | Baier |
| 5,436,040 A | 7/1995 | Lafond |
| 5,477,647 A | 12/1995 | Yates, Jr. |
| 5,834,124 A | 11/1998 | Pease, III et al. |
| 5,980,667 A | 11/1999 | Reeder et al. |
| 5,981,631 A | 11/1999 | Ronden et al. |
| 6,035,597 A | 3/2000 | Donaldson |
| 6,115,989 A | 9/2000 | Boone et al. |
| 6,192,651 B1 | 2/2001 | Donaldson |
| 6,345,485 B1 | 2/2002 | Boone et al. |
| 6,415,579 B1 | 7/2002 | Reeder et al. |
| 6,671,572 B1 | 12/2003 | Craft et al. |
| 7,318,301 B2 | 1/2008 | Reeder et al. |
| 7,681,369 B2 | 3/2010 | Soltesiz et al. |
| 7,743,570 B2 | 6/2010 | Reichert |
| 7,949,422 B1 | 5/2011 | Little et al. |
| 8,061,036 B1 * | 11/2011 | Plummer et al. ........... 29/897.32 |
| 2007/0154663 A1 | 7/2007 | Wang et al. |
| 2008/0006760 A1 | 1/2008 | Sibbett |
| 2008/0047208 A1 | 2/2008 | Soltesiz et al. |
| 2009/0139165 A1 | 6/2009 | Prete et al. |
| 2010/0236167 A1 | 9/2010 | Parker |

* cited by examiner

*Primary Examiner* — David Bryant
*Assistant Examiner* — Christopher Besler
(74) *Attorney, Agent, or Firm* — Buskop Law Group, P.C.; Wendy Buskop (57) ABSTRACT

A method for making a decorative polymer panel assembly for insertion into an opening of a door or window. The method can include forming a polymer grille by cutting a design into a polymer with a low-moisture content of no more than five wt %. The polymer grille can have a frame portion and a design portion. A seal can be contiguously disposed about a perimeter of the frame portion. A grille assembly can be formed by disposing a translucent panel on each side of the seal, forming an air space with the polymer grille disposed within the air space. The grille assembly can be pressed and heated to form a heat formed seal between the seal, the polymer grille, and each translucent panel. The grille assembly can then be cooled to an ambient temperature, forming the decorative polymer panel assembly.

20 Claims, 9 Drawing Sheets

METHOD FOR MAKING A DECORATIVE SECURITY PANEL FOR DOORS AND WINDOWS

FIELD

The present embodiments generally relate to a method for making a decorative security panel assembly for insertion into an opening of a door or a window.

BACKGROUND

A need exists for a method for making a decorative security panel disposed within translucent panels for doors and windows that can simultaneously provide light transmission and security with a low-moisture security grille that will not introduce condensation to the translucent panels.

A need exist for a method for making a decorative security panel made from recycled and/or recyclable material, thereby reducing waste.

A need exists for a method for making a decorative security panel at a competitive cost within the United States, thereby reducing the number of manufacturing jobs being outsourced to other nations and creating "green" jobs in the United States.

A need exists for a method for making a decorative security panel having a wrought iron appearance, but with a lighter weight, thereby reducing transportation costs and retail prices.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for making a decorative security panel assembly for insertion into a door or window, providing security and a decorative appearance while allowing the transmission of light therethrough. The decorative security assembly can be inserted into an opening of a door or an opening of a structure for a window.

The decorative security assembly can include a grille, also referred to as a polymer security grille or a security grille. The grille can be a burglar resistant grille. The grille can be formed or made of a polymer, a high density polyethylene, an acrylic, a lightweight plastic having a thermal deflection point of at least one hundred eighty degrees Fahrenheit, a recycled graphite composite, a polymer that is a mixture of urethanes and halogen-polymers, a recycled polymer, a plastic alloy or combinations thereof.

The polymer security grille can have a unique combination of features including: being formed of a lightweight polymer, having a decorative appearance, having the appearance of wrought iron, having a low-moisture content, having a high melting point, or combinations thereof. This unique combination of features can provide a polymer security grille that simultaneously provides safety, security, and aesthetic appeal; all while being lightweight, having a low enough moisture content to prevent fogging of the translucent panels from condensation, and having a high enough melting point to prevent melting in high heat conditions.

The grille can have a perimeter. The perimeter of the grille can include a grille front face, a grille back face, a grille first side formed between the grille front face and the grille back face, a grille second side formed between the grille front face and the grille back, a grille top formed between the grille front face and the grille back face, and a grille bottom formed between the grille front face and the grille back face. In one or more embodiments, the grille can have a thickness from about one-fourth of an inch to about three-eighths of an inch, and can weigh less than two pounds.

The grille can have a melting point above one hundred forty degrees Fahrenheit. With a melting point above one hundred forty degrees Fahrenheit, the grille can withstand high heat conditions without melting. In one or more embodiments, the melting point of the grille can be above one hundred eighty degrees Fahrenheit. One or more embodiments include a grille without a coating disposed thereon. A grille that does not require a coating to be disposed thereon costs less to manufacture, is more environmentally friendly, and can be more quickly made. Without a coating, the grille can be less toxic and can release less volatile organic compounds "VOCs", or can release no VOCs. The grille can be formed of a polymer that is adapted or configured to release no VOCs, or at least to only release a small amount of VOCs.

In one or more embodiments, the grille can include a design portion that can be disposed between the grille first side, the grille top, the grille second side, and the grille bottom. The design portion can be a decorative element that can include linear portions, curvilinear portions, and open space portions that can be arranged in an aesthetically pleasing manner. The grille can be formed by cutting a design from a polymer, such as a polymer block or a polymer starting material. The cutting of the design within the polymer can be performed in less than thirty minutes. The cutting of the design can be performed using a laser, a computer numeric controlled "CNC" machine, a cutting means, or combinations thereof. The CNC machine be a CNC laser machine, a CNC Router machine, a CNC bandsaw machine, a CNC hot-wire machine, or a CNC water jet machine.

The CNC machine can be used to select and cut the design. The CNC machine can include a processor in communication with a data storage and a cutting means, which can be a laser. The data storage can include computer instructions to instruct the processor to store a library of grille designs. The library of grille designs can include a plurality of grille designs that can be cut into the polymer. The data storage can include computer instructions to instruct the processor to search and identify a grille design from the library of grille designs within the data storage. The data storage can include computer instructions to instruct the processor to instruct the cutting means to cut the identified grille design from the polymer. An example of a CNC machine usable to select and cut the design is a Northwood CNC Router made by Northwood Machine Manufacturing Company of Louisville, Ky.

In one or more embodiments communication can be provided between a client device and the processor over a network. The client device can be a computer, a laptop, or a mobile phone. Computer instruction can be installed onto the client device, such as onto a client device data storage. The computer instructions in the client device can include computer instructions to instruct the processor over the network to: store a library of grille designs on the data storage; search and identify a grille design from the library of grille designs within the data storage; and instruct the cutting means to cut the identified grille design from the polymer. The client device can allow for remote operation of the CNC machine.

A custom designed spoil-board can be used to hold the polymer in place during the cutting of grille design. In one or more embodiments, a vacuum can be used to hold the spoil-board to a surface of the CNC machine during cutting of the grille design. The spoil-board, which can be a piece of medium density fiber board "MDF", can be coated on one or more sides, such that the vacuum does not draw air through the coated portion. The spoil-board can have a portion at least partially cut into a surface of the spoil-board that has the shape of the grille design. The cut portion of the spoil-board can be cut to a depth of about one-fourth inches into the spoil-board without being cut all the way through the MDF. The vacuum can draw air through the cut portion of the spoil-board without drawing air through the coated portion. The polymer can be disposed over a surface of the spoil-board and can be held in place by the vacuum. The spoil-board can reduce vibration, thereby improving the product quality of the polymer grille.

A seal can be contiguously disposed about the grille first side, the grille top, the grille second side, and the grille bottom. The seal can have a seal first side and a seal second side. In one or more embodiments, the seal can be from about one-half an inch to about one inch in thickness. The seal can be formed or made of a variety of materials including elastomeric materials, rubbers, or other materials. An example of a seal is a Decoseal™ manufactured by Truseal Technologies Company of Solon, Ohio.

The decorative security assembly can include one or more translucent panels. The translucent panels can be glass panels, Plexiglas® panels, textured glass panels for providing privacy, tempered safety glass panels, polymeric panels, or transparent panels. A first translucent panel can be disposed over the seal first side. The first translucent panel can have a first front face and a first back face. An air space can be formed between the grille and the first translucent panel. In one or more embodiments, the air space can include air, argon, another inert gas, or a vacuum.

A second translucent panel can be disposed over the seal second side, thereby enclosing the air space. The first translucent panel and the second translucent panel can both be disposed in a spaced apart relationship from the grille. The second translucent panel can have a second front face and a second back face. The grille can be disposed within the air space. The combination of the grille, the seal, and the translucent panels can form at least a portion of the decorative security assembly. The first translucent panel and the second translucent panel can form an insulated glass panel.

In one or more embodiments, a low emissivity "low-E" coating, can be disposed on one or more of the translucent panels. The low-E coating can include metal layers or metallic oxide layers deposited on a surface of the translucent panels. The low-E coating layers can be very thin, such as microscopic in thickness. The seal can engage the faces of the translucent panels without being disposed about an edge of the translucent panels.

In one or more embodiments, the grille can cover, be disposed in front of, or be disposed behind from about five percent to about ninety percent of a surface area of each of the translucent panels. The grille can have a low-moisture content ranging from about zero wt % to about five wt %. In one or more embodiments, the grille can have a moisture content of no more than five wt %. For example, a weight percent of water or other moisture within the material of the grille can be zero wt % or substantially zero wt %. In one or more embodiments, the low-moisture content grille, when inserted into between the translucent panels, will not release any significant amount of moisture into the air space; thereby avoiding "fogging" from condensation on the translucent panels.

The decorative security assembly can include a heat formed seal that can be formed, at least in part, from the seal. The heat formed seal can be formed by: pressing the first translucent panel and the second translucent panel of the decorative security assembly and heating the decorative security assembly. The pressing and heating can be performed simultaneously. The pressing can be at a pressure of up to one hundred twenty psi, and can be performed using a pneumatic press. In one or more embodiments, the pressing can be performed at a pressure that ranges from about ten psi to about one hundred twenty psi. The pressing can be performed using a roller press or a heated roller press, whereby the decorative security assembly can be conducted through a series of pinch rollers to press the decorative security assembly. The pressing can also be performed by hand.

The heating can be at a low temperature of up to one hundred twenty degrees Fahrenheit. In one or more embodiments, the heating can be performed at a temperature that ranges from about one hundred ten degrees Fahrenheit to about one hundred twenty degrees Fahrenheit. The low temperature can release less volatile organic compounds "VOCs" than a high temperature would, and can save manufactures energy and money. The decorative security assembly can then be cooled to an ambient temperature, such as a temperature ranging from about sixty eight degrees Fahrenheit to about seventy seven degrees Fahrenheit. The pressing, heating, and cooling of the decorative security assembly can form a heat sealed decorative security panel assembly, also referred to as a decorative security panel.

One or more embodiments can include a frame assembly with a first frame and a second frame. The first frame can be engaged over the first front face of the first translucent panel. The second frame can be engaged over the second front face of the second translucent panel. The first frame can be engaged with the second frame, such as by screws, fasteners, snap fasteners, any fastening method or means, or any attaching method or means, thereby forming a framed decorative security panel assembly. The decorative security panel assembly can be secured within the frame assembly using an adhesive, such as a silicone or a butyl rubber. The framed decorative security panel assembly can be engaged within an opening in a door, or within an opening in a structure for a window. The frame assembly can be made of plastic, PVC, a polymer, a polymer alloy, wood, or a metal, such as aluminum.

One or more embodiments relate to a door with a decorative security panel assembly. The door can have an opening. The door can be a fiberglass door, wooden door, steel door, or another door. The framed decorative security panel assembly can be disposed within the opening of the door. The framed decorative security panel assembly can be secured within the opening of the door using fasteners, screws, adhesives, or any other attaching means. In one or more embodiments of the door, the first frame and the second frame can each be laser etched and stained fiber glass frames having a natural wood grain effect.

One or more embodiments relate to a window with a decorative security panel assembly. The window can have an opening in a structure, such as an opening or hole in a wall adapted for installing a window therein. The decorative security panel assembly can be disposed within a window frame of the window. The window frame can be engaged within the opening of the structure. The decorative security panel assembly can be secured within the window frame using fasteners, such as screws.

One or more embodiments relate to a door with a decorative polymer security panel assembly made by the method described herein, a window with a decorative polymer security panel assembly made by the method described, or a decorative polymer security panel assembly made by the method described herein.

Figure 1A:
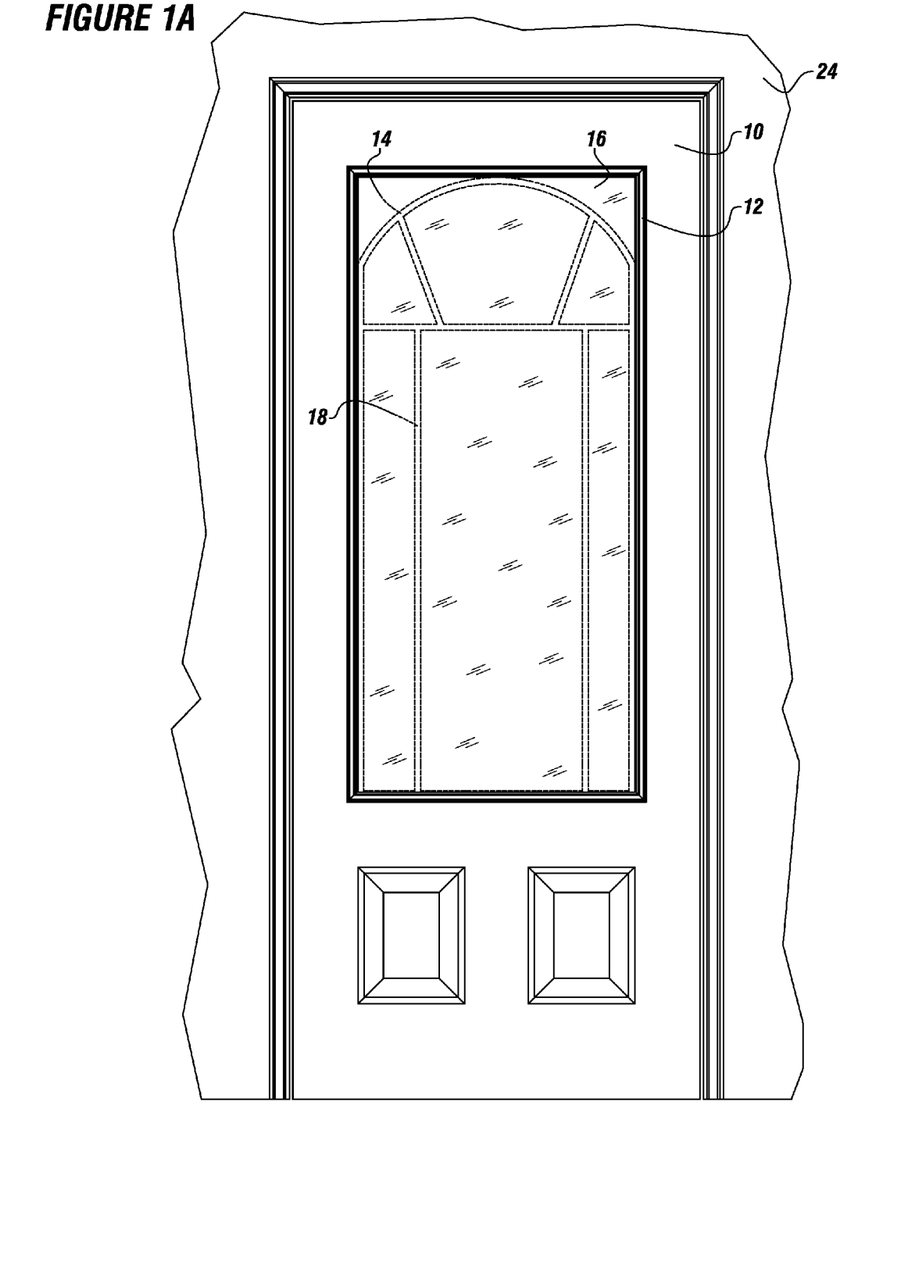
FIG. 1A depicts a front view of a door with a decorative security panel assembly.

Turning now to the Figures, FIG. 1A depicts a front side of an embodiment of a door 10 disposed within an opening in a structure 24. A frame assembly 12 can be disposed within an opening of the door 10. A decorative security grille 14 can be engaged within the frame assembly 12. A first translucent panel 16 can be engaged within the frame assembly 12 and disposed over the decorative security grille 14. The decorative security grille 14 can have a design portion 18.

Figure 1B:
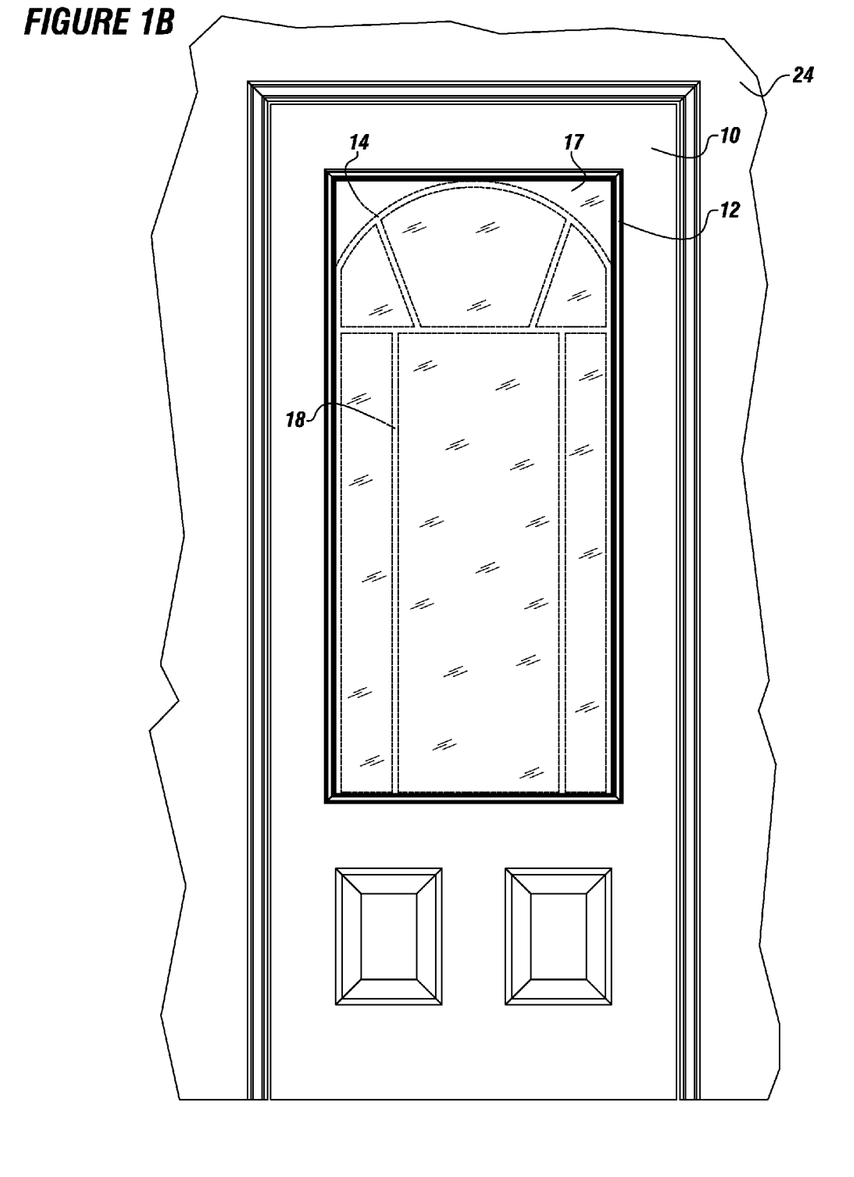
FIG. 1B depicts a back view of the door with the decorative security panel assembly.

FIG. 1B depicts a back side of an embodiment of the door 10 disposed within the opening in the structure 24. The frame assembly 12 can be disposed within the opening of the door 10 with the decorative security grille 14 engaged therein. A second translucent panel 17 can be engaged within the frame assembly 12 and disposed over the decorative security grille 14. Also shown is the design portion 18.

Figure 2A:
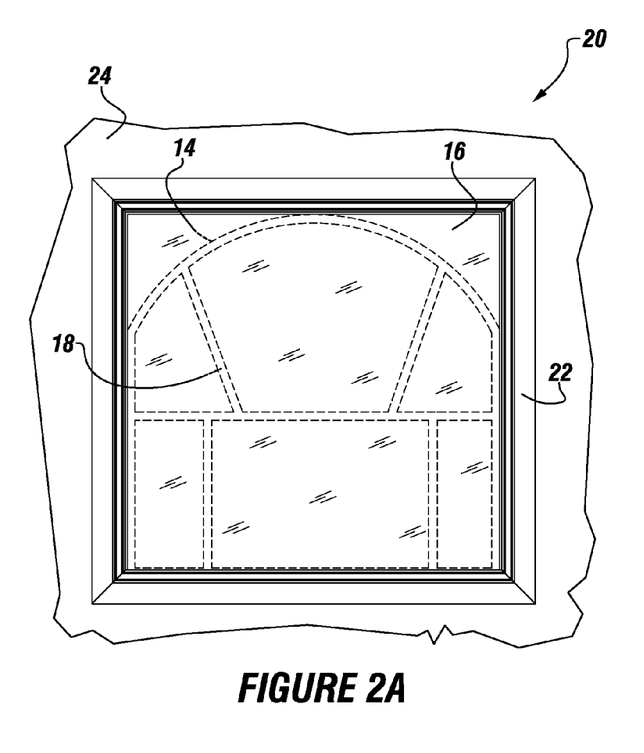
FIG. 2A depicts a front view of a window with a decorative security panel assembly.

FIG. 2A depicts a front side of an embodiment of a window 20 with a window frame 22 disposed in a structure 24. A decorative security grille 14 with a first translucent panel 16 and a design portion 18 can be engaged within the window frame 22.

Figure 2B:
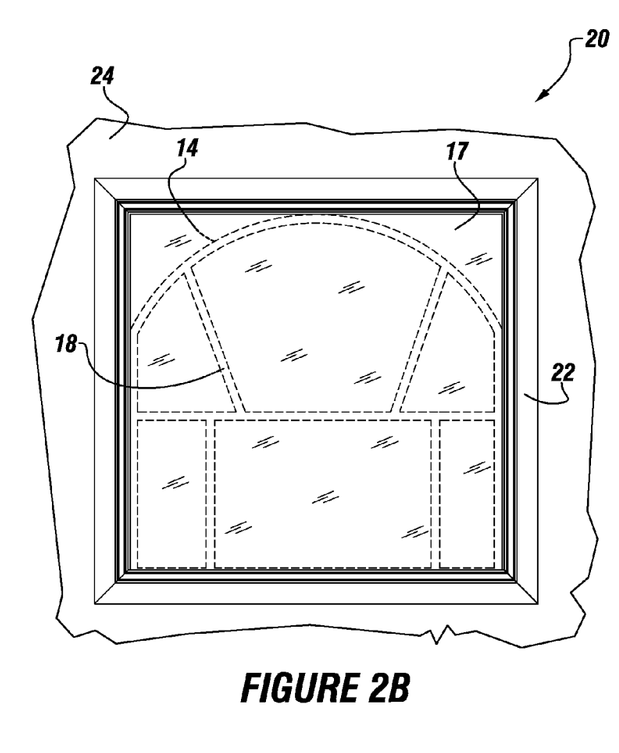
FIG. 2B depicts a back view of the window with the decorative security panel assembly.

FIG. 2B depicts a back side of an embodiment of the window 20 with the window frame 22 disposed in the structure 24. The decorative security grille 14 with a second translucent panel 17 and the design portion 18 can be engaged within the window frame 22.

Figure 3:
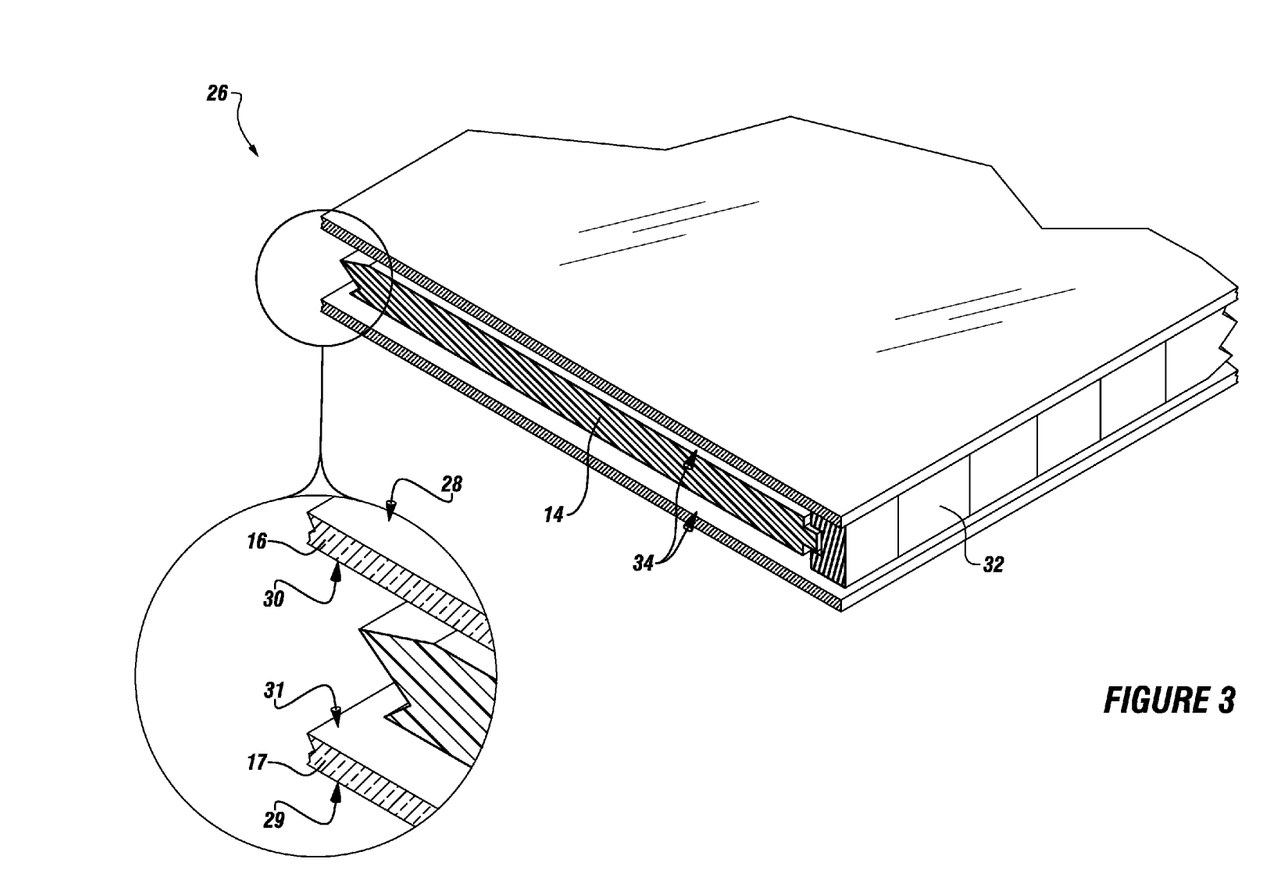
FIG. 3 depicts an embodiment of a decorative security panel assembly.

FIG. 3 depicts an embodiment of a decorative security panel assembly 26 having a first translucent panel 16 with a first front face 28 and a first back face 30. The decorative security panel assembly 26 can include a seal 32 contiguously disposed about a perimeter of the decorative security grille 14. The first back face 30 can be disposed over the seal 32.

The decorative security panel assembly 26 can have a second translucent panel 17 with a second front face 29 and a second back face 31. An air space 34 can be formed between the first translucent panel 16 and the second translucent panel 17.

Figure 4:
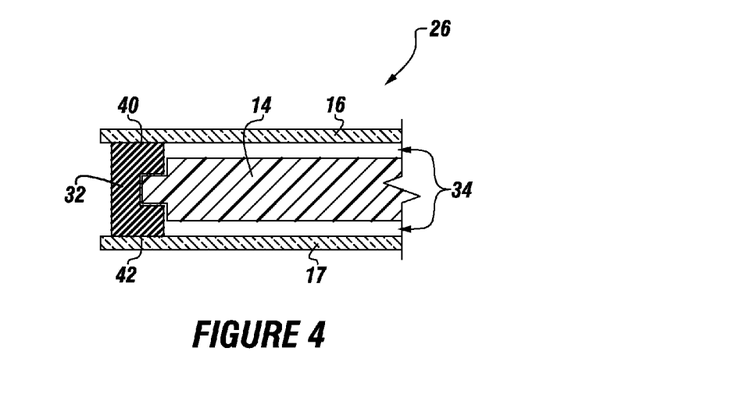
FIG. 4 depicts a cut view of a decorative security panel assembly.

FIG. 4 depicts a cut view of an embodiment of the decorative security panel assembly 26 with the first translucent panel 16, the seal 32, the second translucent panel 17, the decorative security grille 14 and the air space 34. The seal 34 can have a seal first side 40 and a seal second side 42.

Figure 5:
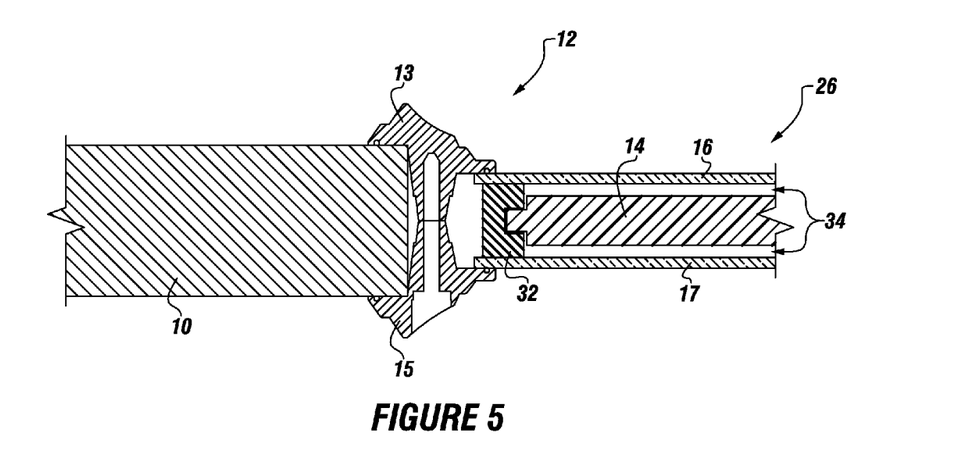
FIG. 5 depicts a cut view of a decorative security panel assembly engaged with a door.

FIG. 5 depicts a cut view of an embodiment of the decorative security panel assembly 26 with the first translucent panel 16, the seal 32, the second translucent panel 17, the decorative security grille 14 and the air space 34.

The frame assembly 12 can have a first frame 13 engaged with a second frame 15. The frame assembly 12 can be engaged with a door 10.

Figure 6A:
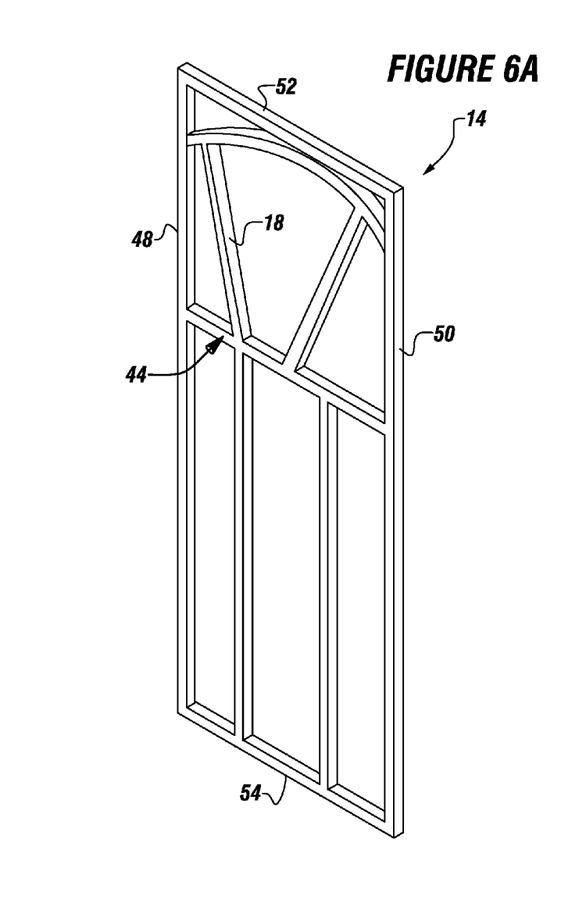
FIG. 6A depicts a first side of an embodiment of a polymer security grille.

FIG. 6A depicts an embodiment of the decorative security grille 14 with a grille front face 44, a grille first side 48, a grille second side 50, a grille top 52, a grille bottom 54, and a design portion 18.

Figure 6B:
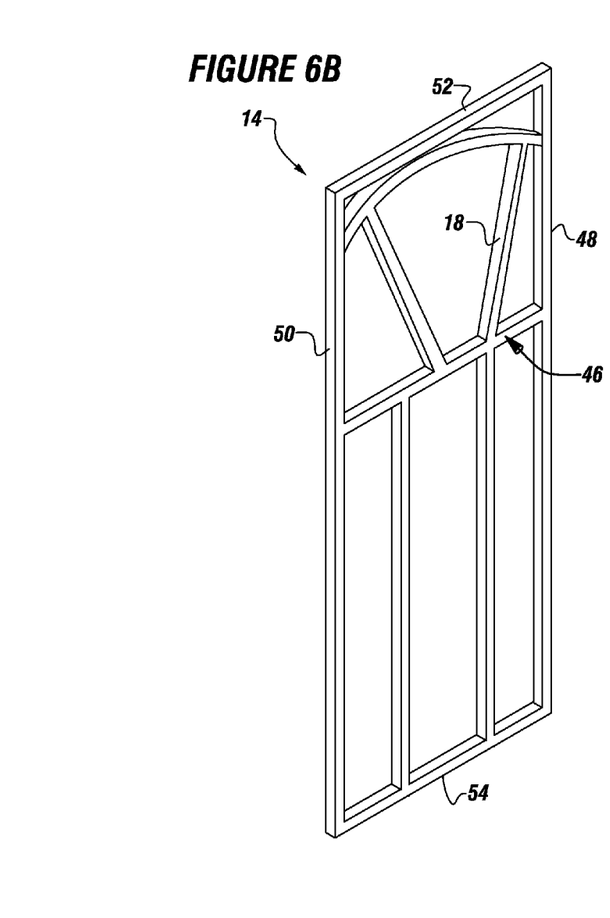
FIG. 6B depicts a second side of an embodiment of the polymer security grille.

FIG. 6B depicts an embodiment of the decorative security grille 14 with a grille back face 46, the grille first side 48, the grille second side 50, the grille top 52, the grille bottom 54, and the design portion 18.

Figure 7:
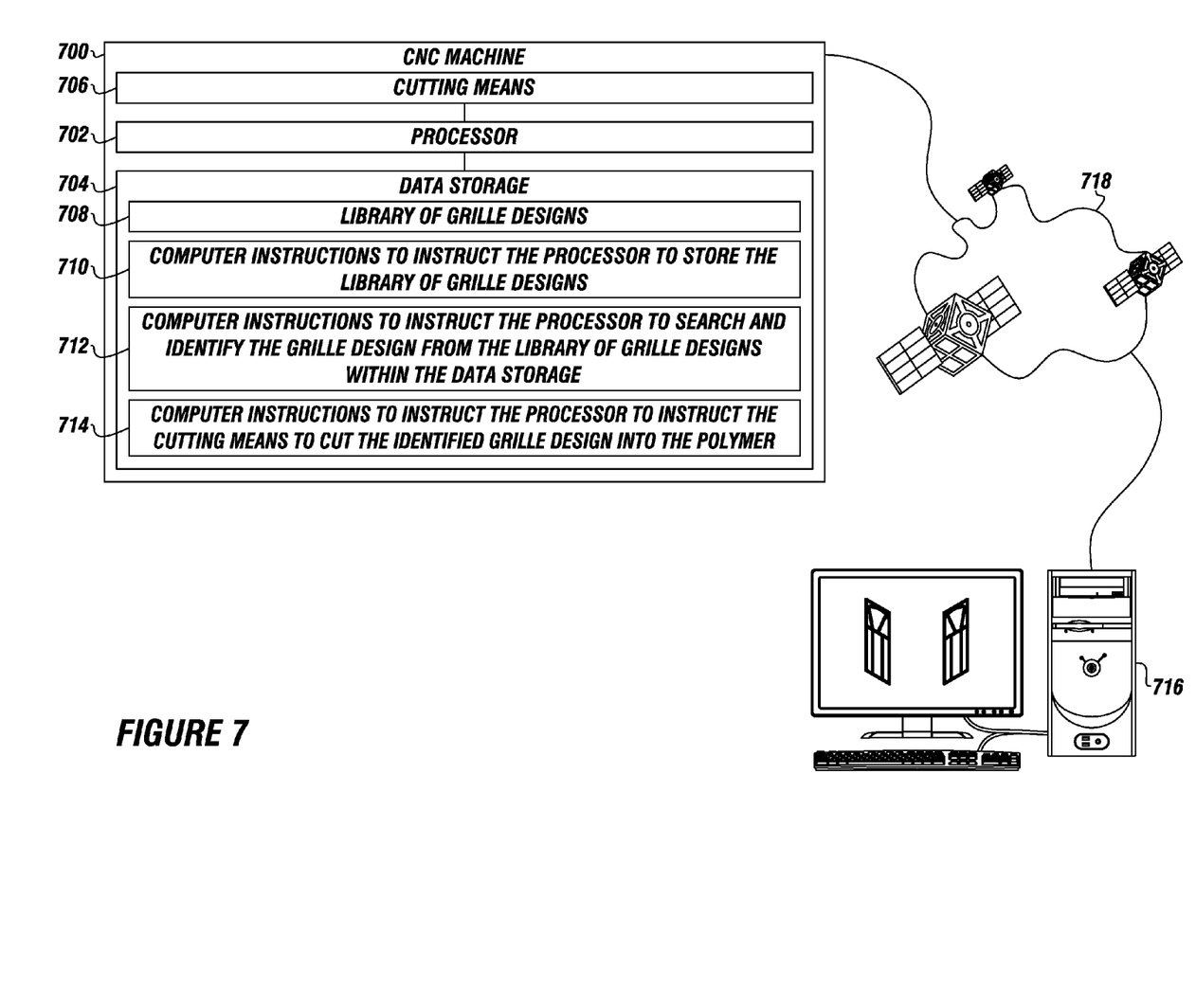
FIG. 7 depicts an embodiment of a system for forming a polymer security grille.

FIG. 7 depicts an embodiment of a system for forming a polymer security grille. A CNC machine 700 with a processor 702, a data storage 704, and a cutting means 706 is depicted. A library of grille designs 708 can be stored in the data storage 704. The data storage 704 can have computer instructions to instruct the processor to store the library of grille designs 710, computer instructions to instruct the processor to search and identify the grille design from the library of grille designs within the data storage 712, and computer instructions to instruct the processor to instruct the cutting means to cut the identified grille design into the polymer 714.

A client device 716 can be in communication over a network 718 device and the with the CNC machine 700. The client device can include the same computer instructions as the data storage 704 for remote control of the CNC machine.

Figure 8A:
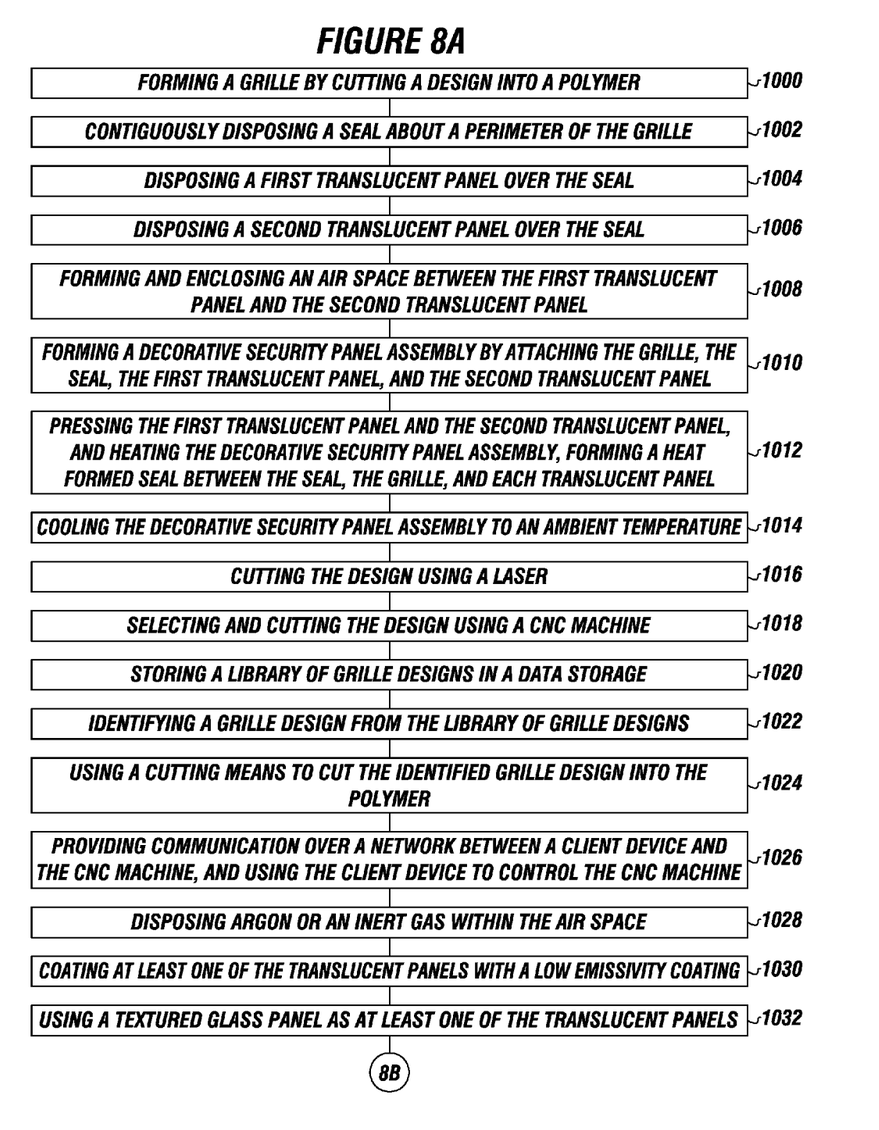
FIG. 8A depicts an embodiment of a method of making a decorative security panel assembly.

FIG. 8A is a flow chart of an embodiment of a method for making a decorative security panel assembly for insertion into an opening of a door or an opening of a window.

The method can include forming a grille by cutting a design into a polymer, as illustrated by box 1000.

The method can include contiguously disposing a seal about a perimeter of the grille, as illustrated by box 1002.

The method can include disposing a first translucent panel over the seal, as illustrated by box 1004.

The method can include disposing a second translucent panel over the seal, as illustrated by box 1006.

The method can include forming and enclosing an air space between the first translucent panel and the second translucent panel, as illustrated by box 1008.

The method can include forming a decorative security panel assembly by attaching the grille, the seal, the first translucent panel, and the second translucent panel, as illustrated by box 1010.

The method can include pressing the first translucent panel and the second translucent panel, and heating the decorative security panel assembly, forming a heat formed seal between the seal, the grille, and each translucent panel, as illustrated by box 1012.

The method can include cooling the decorative security panel assembly to an ambient temperature, as illustrated by box 1014.

The method can include cutting the design using a laser, as illustrated by box 1016.

The method can include selecting and cutting the design using a CNC machine, as illustrated by box 1018.

The method can include storing a library of grille designs in a data storage, as illustrated by box 1020.

The method can include identifying a grille design from the library of grille designs, as illustrated by box 1022.

The method can include using a cutting means to cut the identified grille design into the polymer, as illustrated by box 1024.

The method can include providing communication over a network between a client device and the CNC machine, and using the client device to control the CNC machine, as illustrated by box 1026.

The method can include disposing argon or an inert gas within the air space, as illustrated by box 1028.

The method can include coating at least one of the translucent panels with a low emissivity coating, as illustrated by box 1030.

The method can include using a textured glass panel as at least one of the translucent panels, as illustrated by box 1032.

Figure 8B:
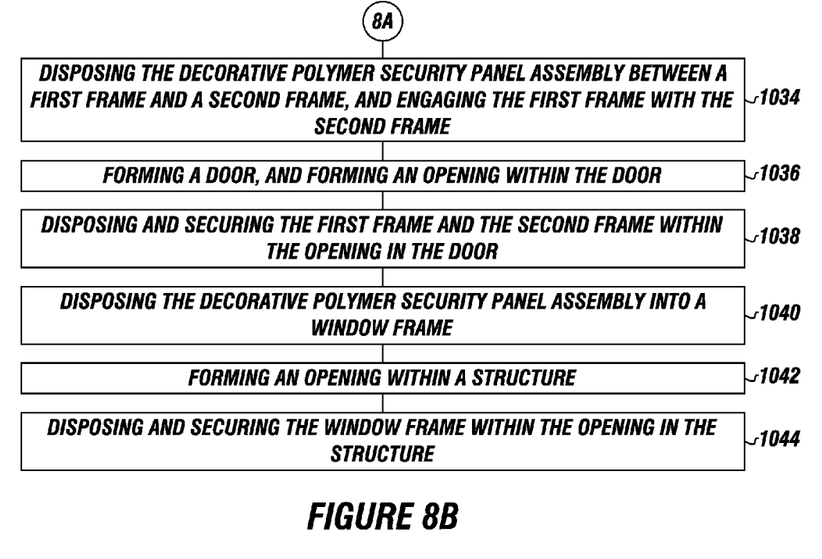
FIG. 8B is a continuation of FIG. 8A.

FIG. 8B is a continuation of FIG. 8A. The method can further include disposing the decorative polymer security panel assembly between a first frame and a second frame, and engaging the first frame with the second frame, as illustrated by box 1034.

The method can include forming a door, and forming an opening within the door, as illustrated by box 1036.

The method can include disposing and securing the first frame and the second frame within the opening in the door, as illustrated by box 1038.

The method can include disposing the decorative polymer security panel assembly into a window frame, as illustrated by box 1040.

The method can include forming an opening within a structure, as illustrated by box 1042.

The method can include disposing and securing the window frame within the opening in the structure, as illustrated by box 1044.

While these embodiments have been described with emphasis on the embodiments, it should be understood that within the scope of the appended claims, the embodiments might be practiced other than as specifically described herein.

What is claimed is:

1. A method for making a decorative security panel assembly for insertion into an opening of a door or an opening of a window, the method comprising:
   a. storing a library of grille designs in a data storage of a computer numeric controlled machine having a processor in communication with the data storage; identifying a grille design from the library of grill designs; and forming a polymer security grille by selecting the identified grille design and cutting the identified grille design into a polymer using a cutting means of the computer numeric controlled machine, wherein the polymer security grille has a melting point above one hundred forty degrees Fahrenheit and a low-moisture content of no more than five wt %, and wherein the polymer security grille further comprises:
      (i) a grille front face and a grille back face;
      (ii) a grille first side formed between the grille front face and the grille back face;
      (iii) a grille second side formed between the grille front face and the grille back face;
      (iv) a grille top formed between the grille front face and the grille back face; and
      (v) a grille bottom formed between the grille front face and the grille back face;
   b. contiguously disposing a seal about the grille first side, the grille top, the grille second side, and the grille bottom, wherein the seal has a seal first side and a seal second side;
   c. disposing a face of a first translucent panel over the seal first side;
   d. disposing a face of a second translucent panel over the seal second side; forming an air space enclosed between the first translucent panel and the second translucent panel; wherein the polymer security grille is disposed within the air space; wherein the polymer security grille, the seal, the first translucent panel, and the second translucent panel form a decorative security panel; and wherein the polymer security grille is spaced apart from the first translucent panel and the second translucent panel;
   e. pressing the first translucent panel and the second translucent panel of the decorative security panel at a pressure up to one hundred twenty psi while simultaneously heating the decorative security panel at a low temperature up to one hundred twenty degrees Fahrenheit, forming a heat formed seal between the seal, the polymer security grille, and each translucent panel; and
   f. preventing fogging of the first translucent panel and the second translucent panel by preventing an introduction of condensation to the first translucent panel and the second translucent panel using the low-moisture content of the polymer security grille, and cooling the decorative security panel to an ambient temperature.

2. The method of claim 1, further comprising heating the decorative security panel at a temperature ranging from one hundred ten degrees Fahrenheit to one hundred twenty degrees Fahrenheit, and pressing the decorative security panel at a pressure ranging from ten psi to one hundred twenty psi, wherein the low-moisture content is substantially zero wt %.

3. The method of claim 1, wherein the cutting means is a laser.

4. The method of claim 1, further comprising:
   a. using computer instructions in the data storage to instruct the processor to store the library of grille designs;
   b. using computer instructions in the data storage to instruct the processor to search and identify the grille design from the library of grille designs within the data storage; and
   c. using computer instructions in the data storage to instruct the processor to instruct the cutting means to cut the identified grille design into the polymer.

5. The method of claim 1, further comprising:
   a. providing communication over a network between a client device and the processor; and
   b. installing computer instructions on the client device to instruct the processor over the network to:
      (i) store the library of grille designs on the data storage;
      (ii) to search and identify the grille design from the library of grille designs within the data storage; and
      (iii) instruct the cutting means to cut the identified grille design from a polymer block.

6. The method of claim 1, wherein the pressing is performed using a pneumatic press, a roller press, or manually.

7. The method of claim 1, further comprising disposing argon or an inert gas within the air space.

8. The method of claim 1, further comprising coating at least one of the translucent panels with a low emissivity coating.

9. The method of claim 1, further comprising using a textured glass panel as at least one of the translucent panels.

10. The method of claim 1, further comprising forming the polymer security grille from a polymer block selected from the group consisting of: a high density polyethylene, a recycled graphite composite, an acrylic, a mixture of urethanes and halogen-polymers, a recycled polymer, a lightweight plastic having a thermal deflection point of at least one hundred eighty degrees Fahrenheit, and combinations thereof.

11. A method for making a decorative security panel assembly for insertion into an opening of a door or an opening of a window, the method comprising:
   a. storing a library of grille designs in a data storage of a computer numeric controlled machine having a processor in communication with the data storage; identifying a grille design from the library of grill designs; and forming a polymer grille by selecting the identified grille design and cutting the identified grille design into a polymer using a cutting means of the computer numeric controlled machine, wherein the polymer grille has a low-moisture content of no more than five wt %, and wherein the polymer grille further comprises a frame portion and a design portion;
   b. contiguously disposing a seal about a perimeter of the frame portion, wherein the seal has a seal first side and a seal second side;
   c. disposing a first translucent panel over the seal first side;
   d. disposing a second translucent panel over the seal second side, forming an air space enclosed between the first translucent panel and the second translucent panel, wherein the polymer grille is disposed within the air space, wherein the seal, the polymer grille, the first translucent panel, and the second translucent panel form a decorative security panel, and wherein the polymer grille is spaced apart from the first translucent panel and the second translucent panel;
   e. pressing the first translucent panel and the second translucent panel while heating the decorative security panel, thereby forming a heat formed seal between the seal, the polymer grille, and each translucent panel; and
   f. preventing fogging of the first translucent panel and the second translucent panel by preventing an introduction of condensation to the first translucent panel and the second translucent panel using the low-moisture content of the polymer grille, and cooling the decorative security panel.

12. The method of claim 11, wherein the cutting means is a laser.

13. The method of claim 11, wherein the pressing is performed using a pneumatic press, a roller press, or manually.

14. The method of claim 11, further comprising disposing argon or an inert gas within the air space.

15. The method of claim 11, further comprising coating at least one of the translucent panels with a low emissivity coating.

16. The method of claim 11, further comprising forming the polymer grille from a polymer block selected from the group consisting of: a high density polyethylene, a recycled graphite composite, an acrylic, a mixture of urethanes and halogen-polymers, a recycled polymer, a lightweight plastic having a thermal deflection point of at least one hundred eighty degrees Fahrenheit, and combinations thereof.

17. The method of claim 1, further comprising simultaneously providing light transmission, safety, security, and aesthetic appeal using the decorative polymer security panel, wherein the decorative security panel assembly is lightweight and has a wrought iron appearance, and wherein:
   a. a design portion is disposed between the grille first side, the grille top, the grille second side, and the grille bottom;
   b. the grille front face, the grille back face, the grille first side, the grille second side, the grille top, and the grille bottom are each flat surfaces that are flush with the seal;
   c. the polymer security grille is burglar resistant; and
   d. the polymer is a one hundred percent recycled polymer.

18. The method of claim 11, further comprising simultaneously providing light transmission, safety, security, and aesthetic appeal using the decorative security panel, wherein the decorative security panel is lightweight and has a wrought iron appearance, and wherein:
   a. the perimeter of the frame portion has flat surfaces that are flush with the seal;
   b. the polymer grille is burglar resistant; and
   c. the polymer is a one hundred percent recycled polymer.

19. A method for making a decorative security panel assembly for insertion into an opening of a door or an opening of a window, the method comprising:
   a. forming a polymer grille by cutting a design into a polymer, wherein the polymer grille has a low-moisture content of no more than five wt %, and wherein the polymer grille further comprises a frame portion and a design portion;
   b. contiguously disposing a seal about a perimeter of the frame portion, wherein the seal has a seal first side and a seal second side;
   c. disposing a first translucent panel over the seal first side;
   d. disposing a second translucent panel over the seal second side, forming an air space enclosed between the first translucent panel and the second translucent panel, wherein the polymer grille is disposed within the air space, wherein the seal, the polymer grille, the first translucent panel, and the second translucent panel form a decorative security panel, and wherein the polymer grille is spaced apart from the first translucent panel and the second translucent panel;
   e. pressing the first translucent panel and the second translucent panel while heating the decorative security panel, thereby forming a heat formed seal between the seal, the polymer grille, and each translucent panel; and
   f. preventing fogging of the first translucent panel and the second translucent panel by preventing an introduction of condensation to the first translucent panel and the second translucent panel using the low-moisture content of the polymer grille, and cooling the decorative security panel.

20. The method of claim 19, further comprising simultaneously providing light transmission, safety, security, and aesthetic appeal using the decorative security panel, wherein the decorative security panel is lightweight and has a wrought iron appearance, and wherein:
   a. the perimeter of the frame portion has flat surfaces that are flush with the seal;
   b. the polymer grille is burglar resistant; and
   c. the polymer is a one hundred percent recycled polymer.

* * * * *